June 7, 1949.  C. C. FUERST  2,472,580
CAMERA SHUTTER WITH AUTOMATIC DIAPHRAGM
Original Filed May 21, 1945                           8 Sheets-Sheet 1
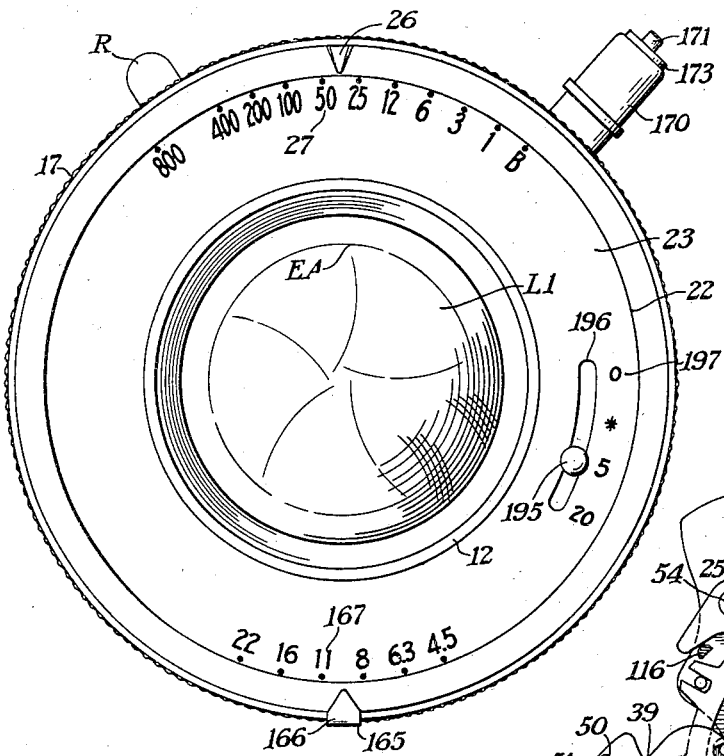
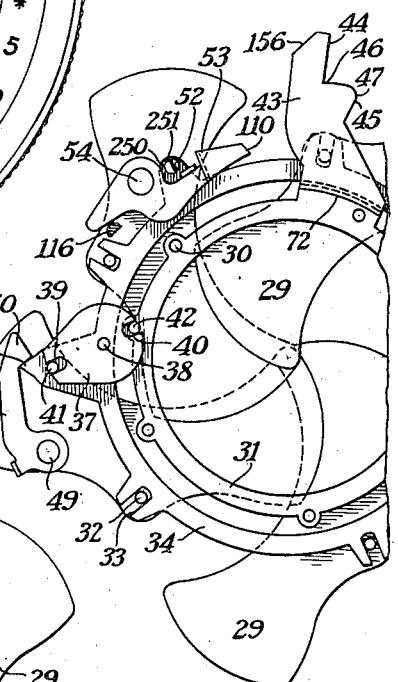
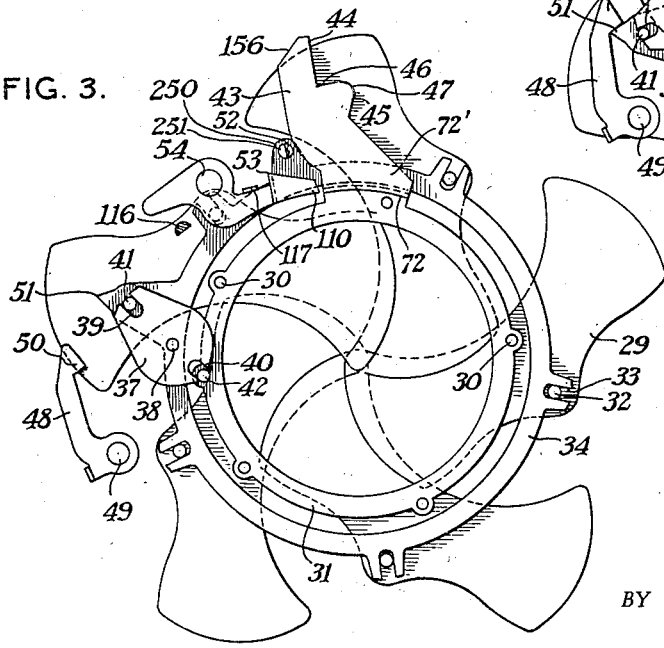
CARL C. FUERST
INVENTOR
BY
ATTORNEYS June 7, 1949. C. C. FUERST 2,472,580
CAMERA SHUTTER WITH AUTOMATIC DIAPHRAGM
Original Filed May 21, 1945 8 Sheets-Sheet 2
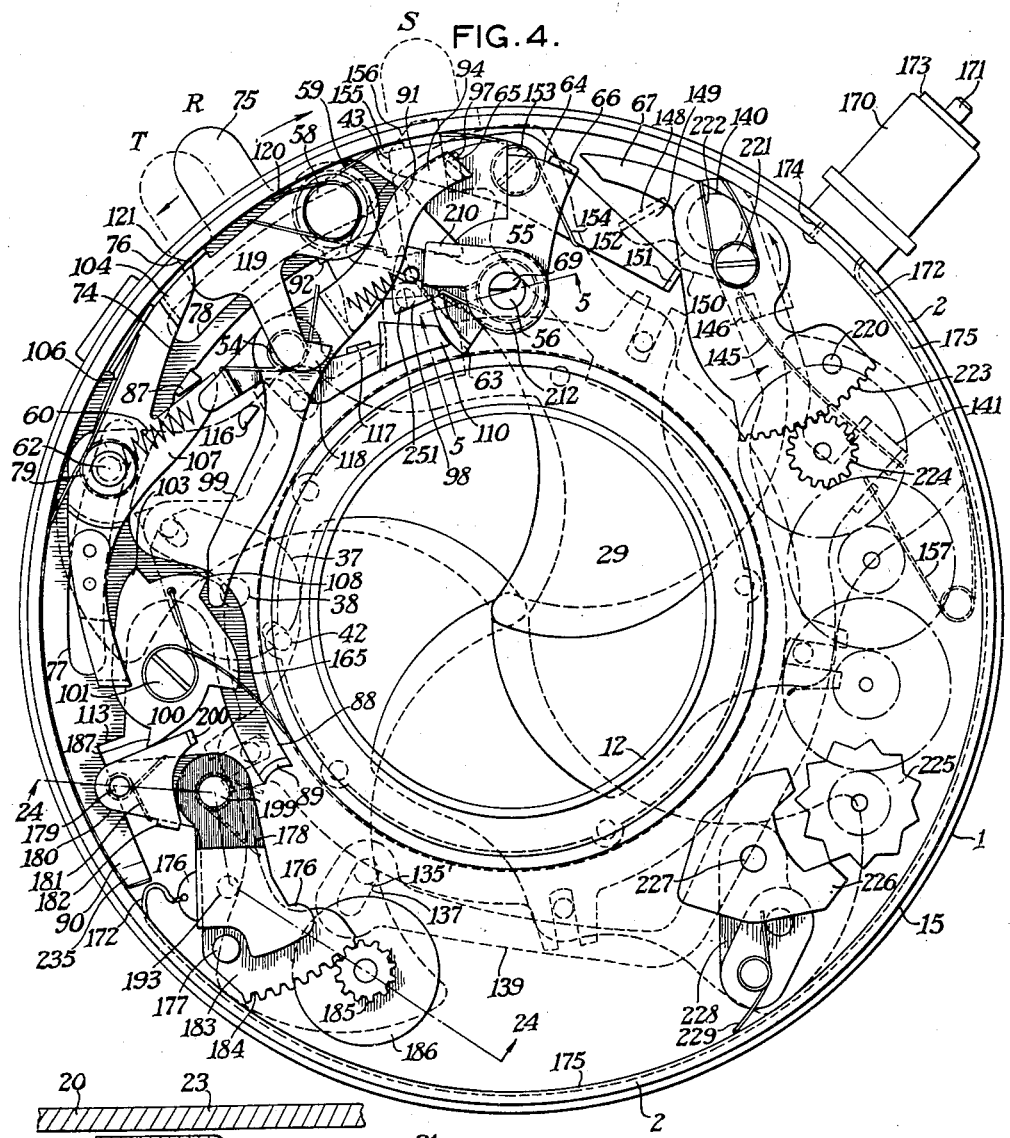
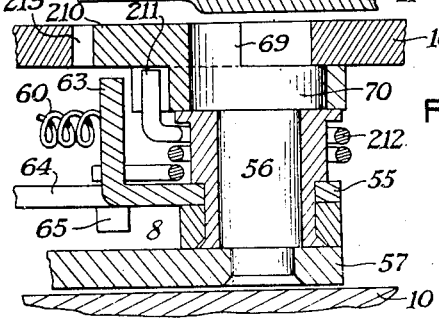
CARL C. FUERST
INVENTOR
ATTORNEYS June 7, 1949. C. C. FUERST 2,472,580
CAMERA SHUTTER WITH AUTOMATIC DIAPHRAGM
Original Filed May 21, 1945 8 Sheets-Sheet 3
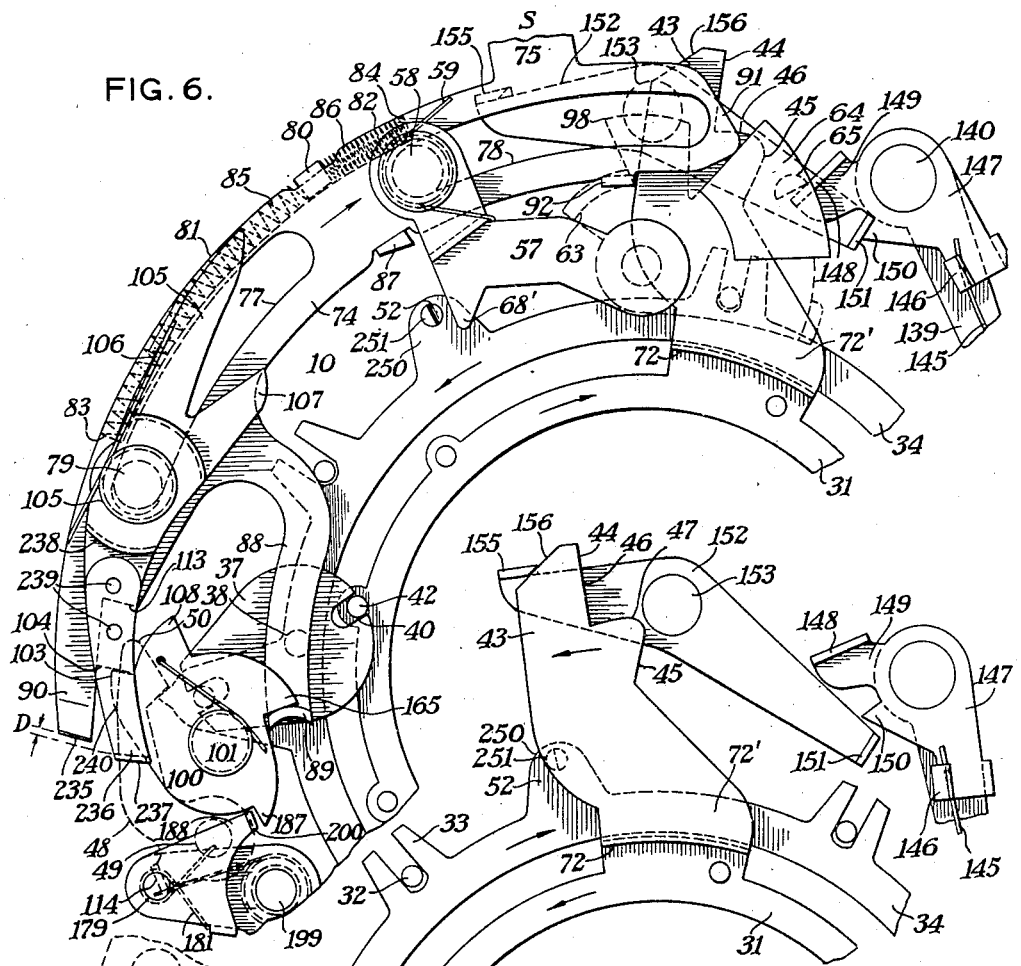
FIG. 6.
FIG. 7.
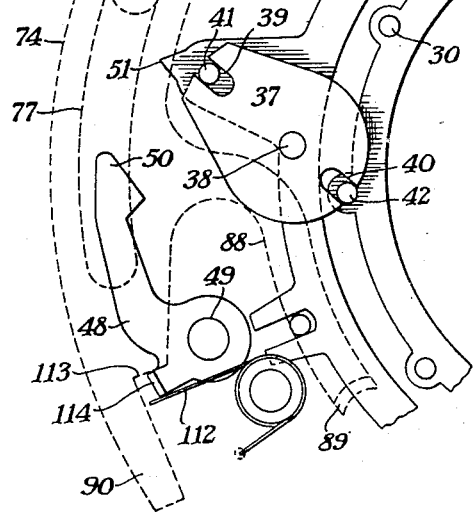
CARL C. FUERST
INVENTOR
BY
ATTORNEYS

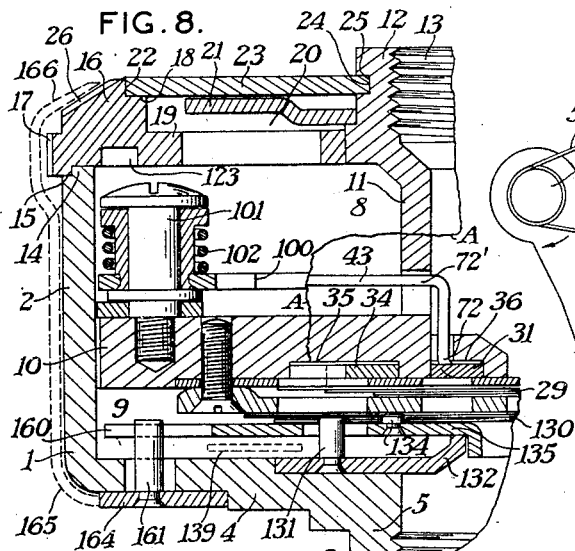
FIG. 8.
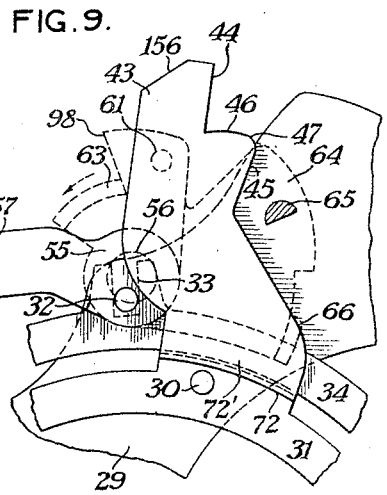
FIG. 9.
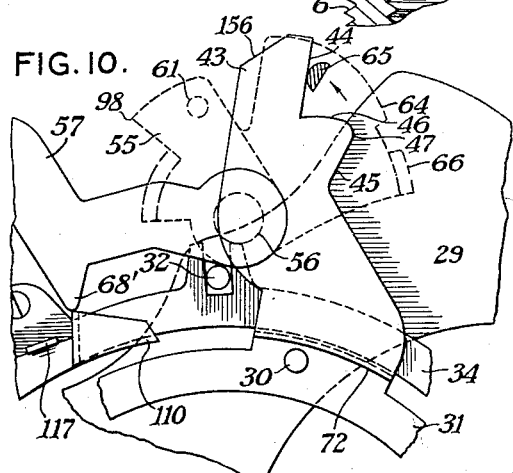
FIG. 10.
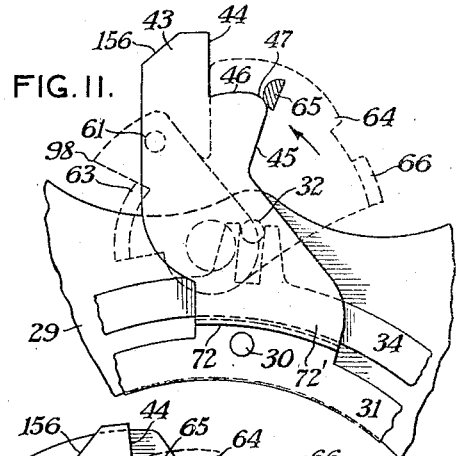
FIG. 11.
FIG. 12.
FIG. 13.
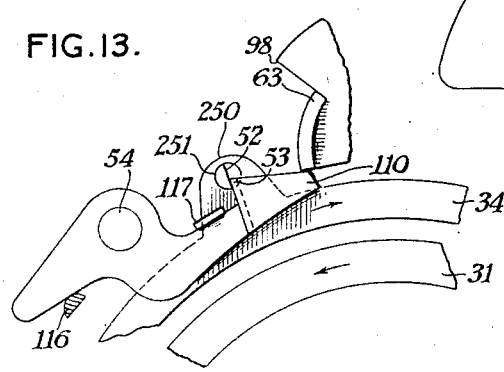
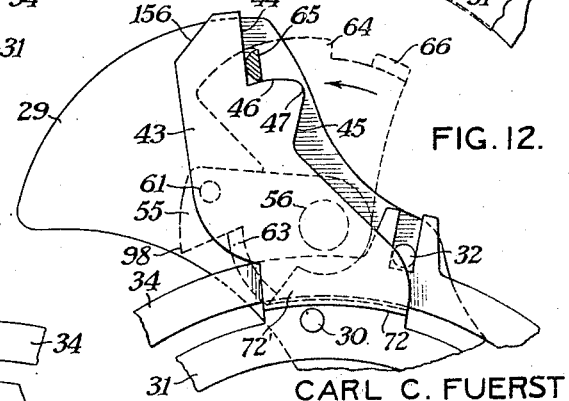
CARL C. FUERST
INVENTOR
BY
ATTORNEYS June 7, 1949.    C. C. FUERST    2,472,580
CAMERA SHUTTER WITH AUTOMATIC DIAPHRAGM
Original Filed May 21, 1945    8 Sheets-Sheet 5
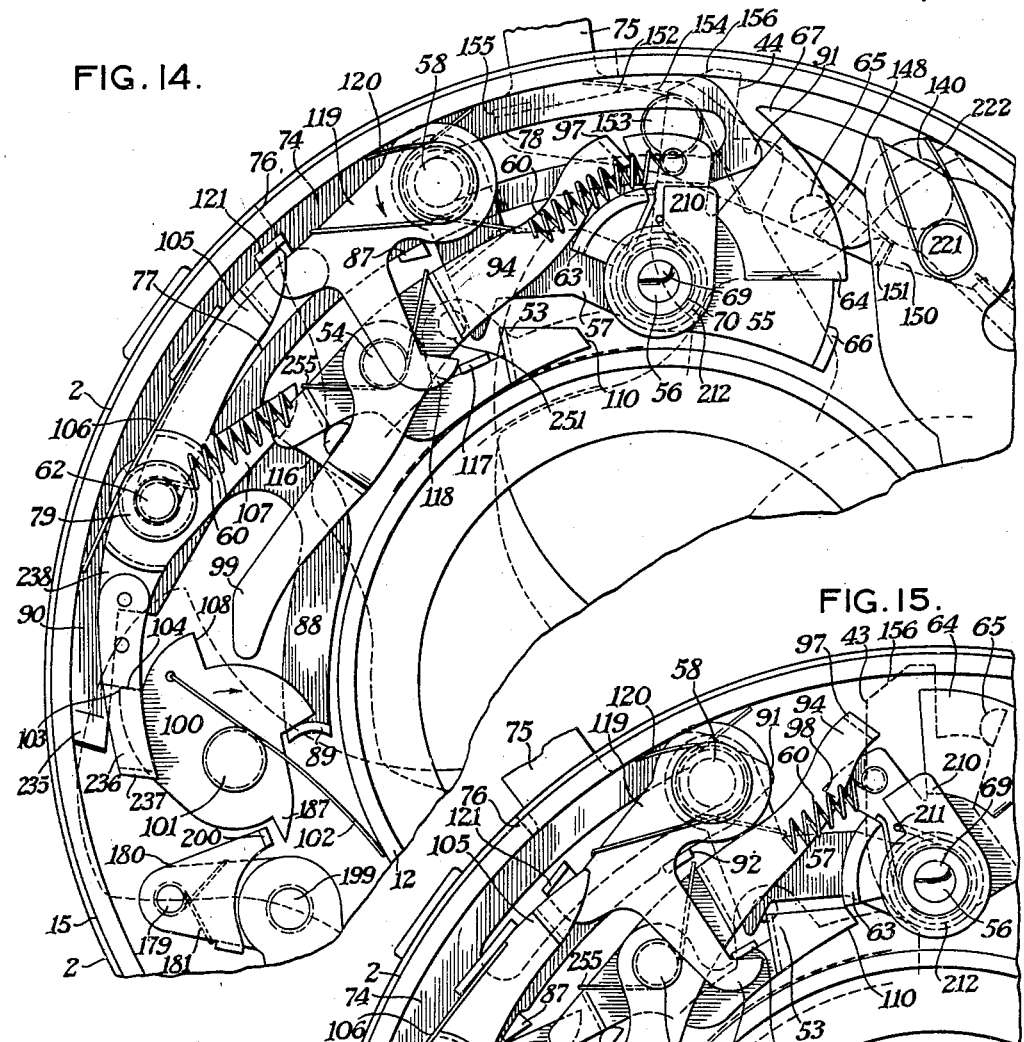
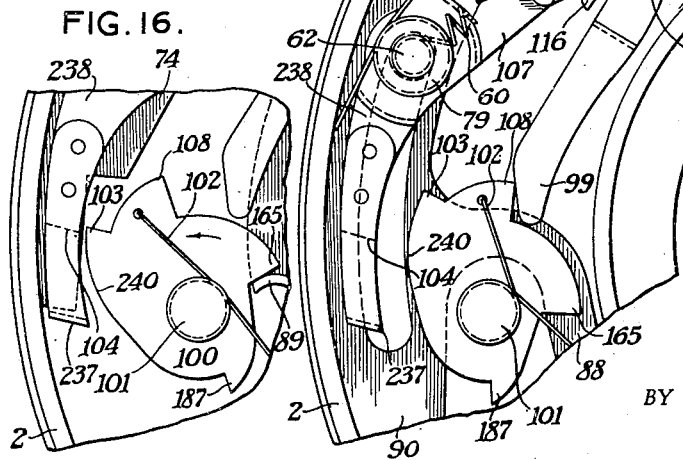
CARL C. FUERST
INVENTOR
BY
ATTORNEYS

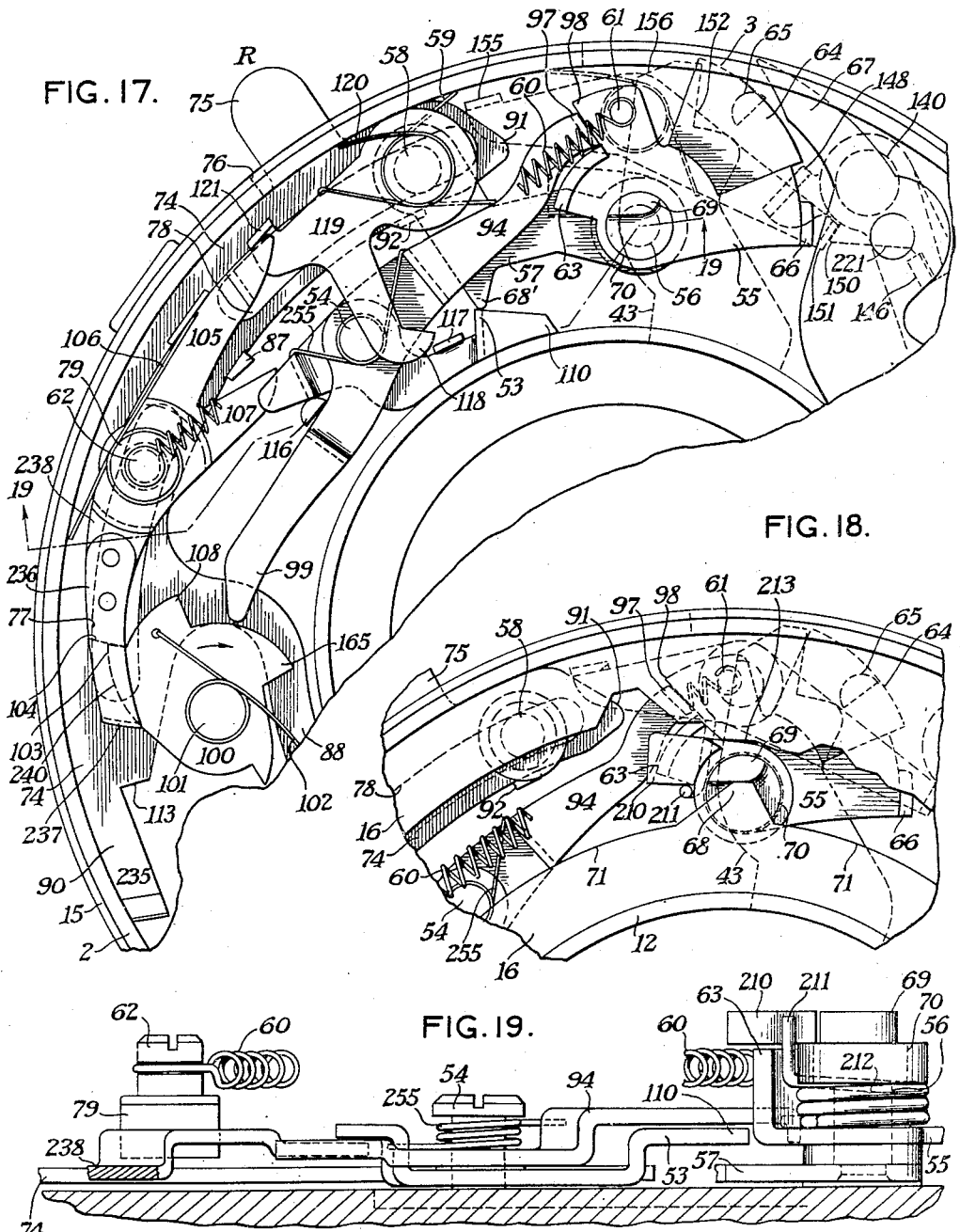

June 7, 1949.  C. C. FUERST  2,472,580
CAMERA SHUTTER WITH AUTOMATIC DIAPHRAGM
Original Filed May 21, 1945  8 Sheets—Sheet 7

CARL C. FUERST
INVENTOR

BY
ATTORNEYS

June 7, 1949.  C. C. FUERST  2,472,580
CAMERA SHUTTER WITH AUTOMATIC DIAPHRAGM
Original Filed May 21, 1945  8 Sheets-Sheet 8
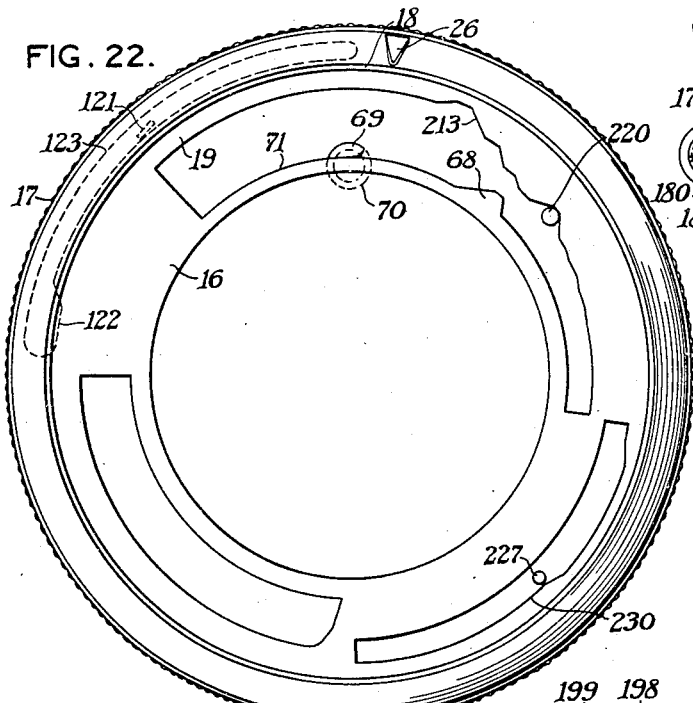
FIG. 22.
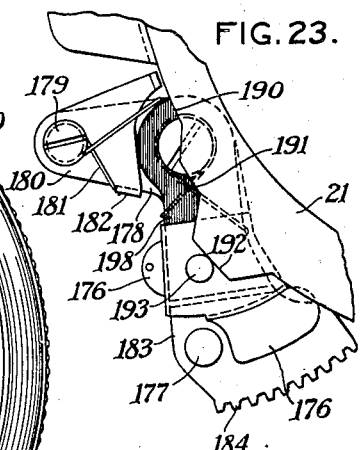
FIG. 23.
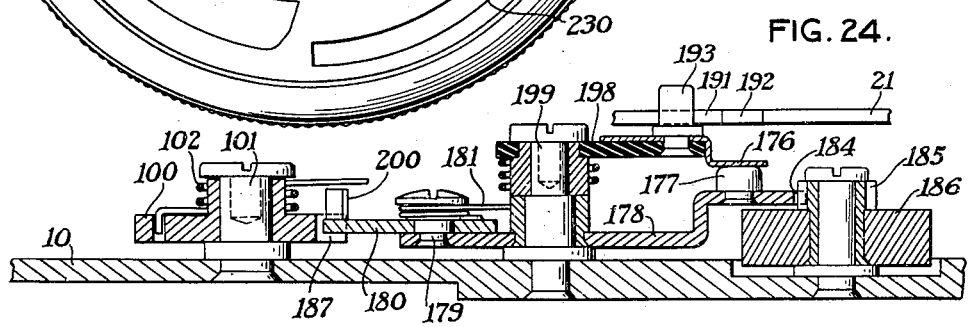
FIG. 24.
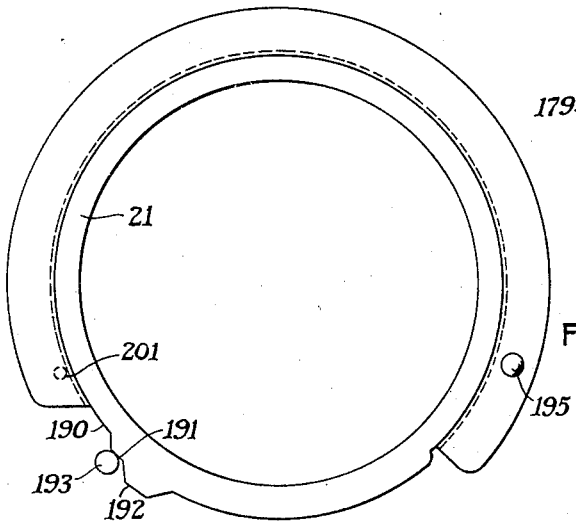
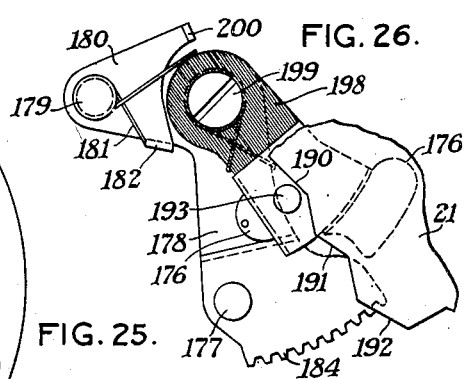
FIG. 25.  FIG. 26.
CARL C. FUERST
*INVENTOR*
BY Newton M. Perrins,
Donald H. Stewart
*ATTORNEYS*

Patented June 7, 1949

2,472,580

UNITED STATES PATENT OFFICE 2,472,580

CAMERA SHUTTER WITH AUTOMATIC DIAPHRAGM

Carl C. Fuerst, Rochester, N. Y., assignor to Eastman Kodak Company, Rochester, N. Y., a corporation of New Jersey Original application May 21, 1945, Serial No. 595,033. Divided and this application July 13, 1946, Serial No. 683,515

9 Claims. (Cl. 95—63)

This invention relates to shutters for cameras. It particularly relates to shutters of the type in which a plurality of shutter leaves are pivotally mounted and connected to a ring, the blades being movable in one direction to open and close the aperture in both making an exposure and in setting. In setting, a diaphragm is automatically actuated to close the opening while the leaves open and close and to open to a predetermined stop afterwards.

One object of my invention is to provide a shutter which will function as above described which requires no special attention on the part of the operator. Still another object of my invention is to drive the diaphragm mechanism for operating the diaphragm leaves in one direction by setting the shutter blade moving means. Other objects will appear from the following specification, the novel features being particularly pointed out in the claims at the end thereof.

This application is a division of my co-pending application Ser. No. 595,033, for Photographic shutter, filed May 21, 1945, this application being a continuation-in-part of my co-pending application Ser. No. 549,529, Photographic shutter, filed August 15, 1944, now abandoned. The structure of this application is for an improvement over the shutters with automatic diaphragms shown in my patents: 2,362,546, Camera shutter, Nov. 14, 1944; 2,362,547, Diaphragm shutter, Nov. 14, 1944; 2,382,624, Camera shutter, Aug. 14, 1945; and 2,384,615, Camera shutter, Sept. 11, 1945.

In the drawings wherein like reference characters denote like parts throughout:

Fig. 1 is a front elevation of a typical shutter constructed in accordance with, and embodying, a preferred form of my invention;

Fig. 2 is a front elevation of a preferred form of shutter blades and a shutter blade operating rings used in the shutter of Fig. 1. This view shows only certain parts in a set position ready for an exposure;

Fig. 3 is a view similar to Fig. 2 but with the parts moved to their released position which they assume after an exposure has been made;

Fig. 4 is an enlarged front elevation of the shutter shown in Fig. 1, but with the shutter cover and adjusting cams removed to expose the mechanism;

Fig. 5 is a fragmentary detail section through the master member and associated parts taken on line 5—5 of Fig. 4;

Fig. 6 is a fragmentary detail front elevation of parts of the shutter actuating mechanism, parts being omitted for clearness;

Fig. 7 is a fragmentary detail front elevation of certain shutter parts including the blade operating rings and certain controls therefor;

Fig. 8 is an enlarged schematic fragmentary sectional view through a portion of the shutter shown in Fig. 1, a portion of this view (shown by section line A—A) being taken through a portion of the blade ring arm to show the relation of these parts in the shutter casing chambers;

Fig. 9 is an enlarged fragmentary front plan view of a portion of the blade rings and master member, the parts being shown in a set position and for exposures of "normal" automatic speeds;

Fig. 10 is a view similar to Fig. 9 but with the parts positioned for a "high" speed exposure. The parts are in a set position;

Fig. 11 is a view substantially similar to Figs. 8 and 9 but with the parts in position to open the blades as the master member moves from one contact surface to another;

Fig. 12 is a view similar to the views of Figs. 9 to 11, inclusive, but with the parts in their "exposed" or fully closed position;

Fig. 13 is a fragmentary detail showing the blade ring latch in an operative position;

Fig. 14 is an enlarged fragmentary front view showing the shutter setting and releasing mechanism, the parts being shown in a fully set position for an exposure of 1/25 of a second;

Fig. 15 is a view similar to Fig. 14 but with the parts shown released for a "bulb" exposure, the blades being fully open;

Fig. 16 is a fragmentary detail plan of the operating handle latch;

Fig. 17 is a view similar to Figs. 14 and 15, but with the parts set for extreme high speed;

Fig. 18 is a detail plan view showing portions of the high speed mechanism with auxiliary spring tensioned;

Fig. 19 is a section taken on line 19—19 of Fig. 17;

Fig. 22 shows the speed adjusting cam removed from the shutter, the cam followers being shown in position;

Fig 23 is a fragmentary detail showing the synchronizing gear train positioned for a 20 millisecond delay;

Fig. 24 is an enlarged fragmentary section through the oscillatable disk and associated retard and taken on line 24—24 of Fig. 4;

Fig. 25 is a plan view of the synchronizing cam removed from the shutter with cam follower indicated in position for 5 millisecond retard;

Fig. 26 is fragmentary detail of synchronizing switch removed from shutter.

Figure 20:
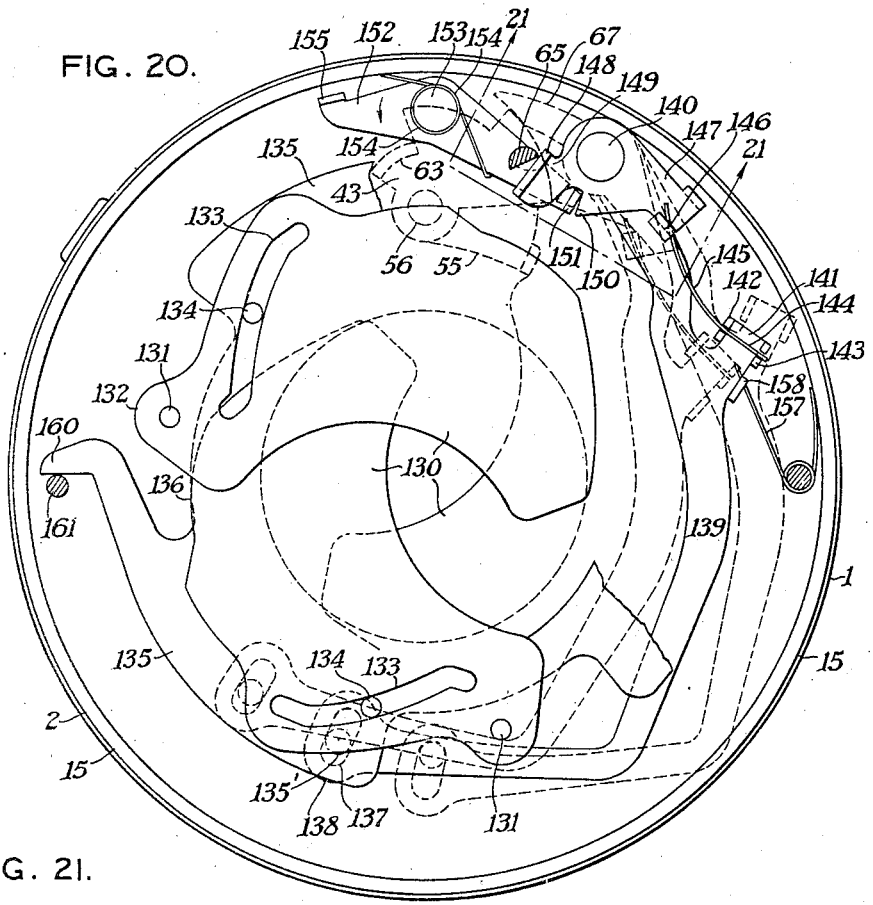
Fig. 20 is a front view with parts removed showing diaphragm leaves and operating mechanism.
Figure 21:
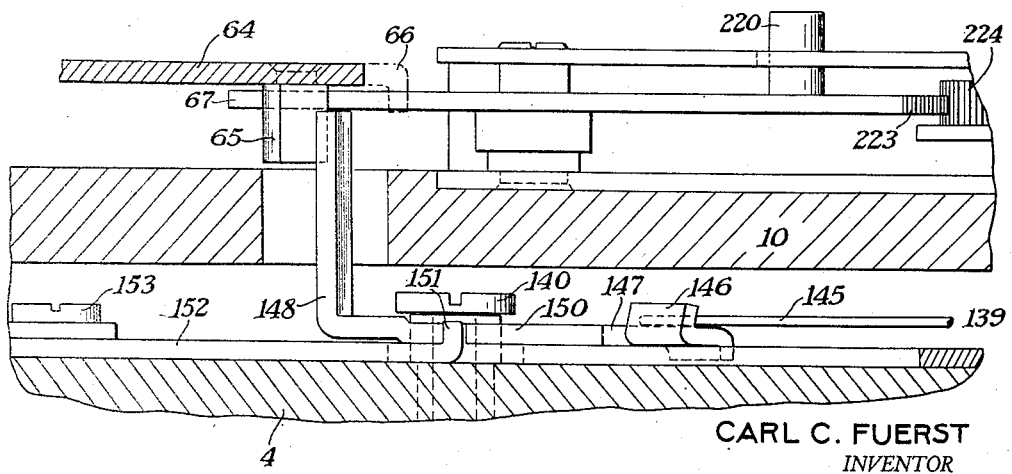
Fig. 21 is an enlarged section taken on line 21—21 of Fig. 20.

My invention comprises broadly a shutter having blades of a symmetrical type movable in one direction only for opening and closing to make an exposure. In setting the blades are likewise moved but in a reverse direction. Consequently I use diaphragm leaves which automatically cover the exposure aperture while the blades open and close during the setting movement. It further comprises mechanisms for operating the blades and diaphragm mechanism in synchronized relationship and for producing a shutter having a wide range of exposures of automatic duration in time as well as mechanism for producing a manually controlled exposure.

In the preferred form of my invention shown in the drawings, the shutter may include the usual type of casing 1 having a central aperture EA through which light passes in making an exposure. The casing is provided with an upstanding annular flange 2 and this flange is provided with a series of milled-out clearance portions 3, these portions being provided to permit certain parts to move through their full path of movement. As indicated in Figure 8, the bottom wall of the shutter 4 is annular in shape and it includes the usual rearwardly-extending tubular portion 5 normally threaded on the outside at 6 for attachment to a support, and threaded on the inside at 7 to receive the usual lens mount. The shutter casing is divided roughly into two chambers 8 and 9 by means of a mechanism plate 10. This mechanism plate consists of a ring-shaped member having an upstanding flange 11 of a generally cylindrical form and a forwardly-extending tubular member 12 internally threaded at 13 to support the front lens L1. The mechanism plate is secured in place by means of posts carried by the bottom of the shutter 4 and by means of screws passing through the mechanism plate 10 and into these posts. As this construction is customary, the posts and screws are not shown in the drawings.

The upstanding flange 2 of the shutter casing is preferably provided with a rim 14 which may be rabbeted at 15 if desired so as to receive a time-control cam 16 which is in the form of an annular ring and which is provided with a knurled edge 17 for turning the ring, a rabbet 18 and a flange 19, providing a space 20 in which a flash cam ring 21 may turn. The rabbet 18 receives an edge 22 of an etched plate 23 which also is provided with ears 24 forming a part of a bayonet type latch, the slots or notches 25 in the tubular member 12 forming the other part of the bayonet latch. This etched plate, when placed on the front of the shutter, remains in a fixed position, although the time-control cam supported on its outer periphery, may turn freely a distance necessary to bring a pointer 26 carried by the time-control cam opposite any one of the shutter speed graduations 27 carried by the etched plate 23.

Generally speaking, the shutter mechanism is contained in the chamber 8 above the mechanism plate 10 and the shutter blades 29 and the diaphragm leaves 130 are carried in the chamber 9 beneath the mechanism plate.

The shutter blades 29 are of the symmetrically-shaped type which move only in one direction for opening and closing the exposure aperture 2. Each shutter blade, Figs. 2 and 3, 29 may be pivotally attached at 30 to a blade ring 31 and each shutter blade 29 may include a pin 32 extending into a slot 33 in a second blade ring 34. Each blade ring 31 and 34 is, as shown in Fig. 8, mounted to move in an arcuate slot, blade ring 34 in a slot 35 and blade ring 31 in a slot 36 formed in the underside of the mechanism plate 10. Each of these blade rings may therefore slide in their annular slot, and motion from one blade ring is transmitted to the opposite blade ring by means of a double-ended lever 37 as shown in Figs. 2 and 3. Lever 37 is carried on a pivot 38 and may freely turn thereon and includes a pair of oppositely disposed slots 39 and 40, the slot 39 engaging a pin 41 carried by the blade ring 34 and the slot 40 engaging a pin 42 carried by the blade ring 31. Thus, movement of ring 34 is simultaneously transmitted to blade ring 31 and as these blade rings move in opposite directions, the blades are moved in one direction through their path of movement, thus opening and closing the shutter aperture EA.

The blade ring 31 in this instance is the driven member and for this purpose the blade ring includes an upstanding arm 43 which has two radially and annularly offset contact surfaces 44 and 45. These surfaces include a connecting surface 46 which is rounded into the contact surface 45 by the curved wall 47.

There is a blade ring latch 48 pivoted on a stud 49 and having a latching element 50 lying in the path of movement of a latching element 51 carried by the blade ring 34. The latched position is shown in Fig. 2 and the unlatched position is shown in Fig. 3. The blade rings are latched when the shutter is set and before an exposure is to be made.

The blade ring 34 as best shown in Fig. 13 carries an ear 250 supporting an upstanding holding pin 251 which may be made of a round rod milled in half to provide a shoulder 52. This pin moves in the direction shown by the arrow on the blade ring 34 in Fig. 13 when an exposure is to made and the pin 251 may be engaged and held by the latch 53 when the blades 29 are moved to an open position. Latch 53 is pivotally mounted on a stud 54 carried by the mechanism plate and may be moved by a spring 255 (Fig. 15) in a counter-clockwise direction about the pivot 54. This latch 53 and shoulder 52 are for temporarily holding the shutter with the shutter blades 29 in their wide-open position for exposures of less than the highest speed. This will be more fully described later.

The driving mechanism or master member construction is best shown in Figs. 9 to 12 inclusive. The master member 55 is pivoted on a stud 56, this stud being carried by a lever 57 pivoted to the mechanism plate on a pivot 58. A spring 59 tends to turn this lever in the direction shown by the arrow in Fig. 9. As indicated in Fig. 14, a power spring 60 is attached to a pin 61 carried by the master member and to a stud 62 carried by the shutter casing. This spring always tends to turn the master member in the direction shown by the arrow in Fig. 9. The master member includes an upstanding flange 63 about which the spring 60 may be partially wrapped when the master member is in a position of tension or when it is set as shown in Fig. 9.

The master member 55 includes a flange 64 which carries a striking surface 65 which, in this instance, is shown as being a half-round pin. It likewise includes an upstanding flange 66, the function of which is to operate a shutter retard arm 67 as shown in Fig. 14. The master member 55 in Fig. 9 is shown in its set position from which position it operates to make exposures from one second to 1/400 of a second according to the setting. The arm 57 may be moved by means of a cam 68 to position the master member 55 for highspeed exposures of 1/800 of a second. Thus, the master member is swung bodily on the pivoted lever 57 between the "high speed" and the "normal speed" positions when the time-control cam 16 is moved.

The time-control cam 16 as shown in Fig. 22 consists of a ring movably mounted on the shutter casing as above described, this ring including a cam lug 68 which is the highspeed lug in that when the cam ring is moved until the pointer 26 is opposite the graduation 800 as indicated in Fig. 1, the cam follower 69, shown in Figs. 5 and 22, is moved radially outwardly by the cam 68, thereby swinging the lever 57 in a substantially radial direction against the action of its spring 59 and positioning the master member in the highspeed position of Figure 10. The cam follower 69 is preferably made by milling off a portion of the head 70 of the stud 56 on which the master member 55 is mounted to swing. However, this is just a convenience in manufacture. From the cam shown in Fig. 22 it will be noticed that in the present embodiment of my invention the cam follower 69 is only moved when the lug 68 engages it and this only occurs when the highest speed 1/800 is to be used. In all other positions the cam follower is moved down against the concentric cam surface 71 in which the lever 57 is held in its "normal" speed position. That is, the position in which it will lie for all shutter speeds other than 1/800 and including "bulb."

It will be noticed from Fig. 5 that the master member 55 lies above the mechanism plate 10 and from Fig. 8 that the blade ring 31 which carries the driving arm 43 lies beneath the mechanism plate. From the small section A—A in Fig. 8 it will be noticed that this is accomplished by bending the arm 43 sharply upwardly at 72 and outwardly at 72' so that the radially-extending arm 43 may lie substantially in the plane of the master member 55 and in a position to be struck by the striking surface 65.

In order to set and release the shutter, I preferably provide a manually-operable lever 74 as shown in Fig. 6. This lever has a handle 75 which projects through a slot 76 in the upstanding flange 2 of the shutter casing (Fig. 14). Referring to Fig. 6, the manually-operable lever is an arcuate plate having arcuate slots 77 and 78 which slide about studs 79 and 58. Stud 58 also supports the master member carrying pivoted lever 57. The arcuate plate 74 carries a lug 80 which engages one end of a spring 81 and one end of a second spring 82, the opposite end of spring 81 engaging an abutment 83 and the opposite end of spring 82 engaging an abutment 84. Spring 81 lies in a groove 85 in the mechanism plate 10 and spring 82 lies in a similar groove 86, the purpose of these two springs being to normally hold the manually-operated lever 74 in a normal position of rest indicated by "R" in Fig. 4. This figure also shows the set position "S" of the lever 75 and the tripped position "T" since the single lever 74 is used to both set and trip the shutter, and serves both for a shutter setting lever and a trigger.

Referring again to Fig. 6, the lever 74 includes a releasing lug 87 formed upwardly from the lever and includes an offset arm 88 having an upturned flange 89. Lever 74 has an extended arm 90, the purpose of which will be later described. On the opposite end of the lever 74 there is a nose 91 which is positioned to engage and move the master member 55 through engagement with part 64 thereof, so as to swing the master member to its set position as shown in Fig. 6. At the same time an upwardly-extending lug 92 carried by the lever 74 may engage and turn the blade ring arm 43 so that it too will be moved to the set position shown in Fig. 6.

When the master member 43 is moved to its set position (Figs. 17 and 18) it may be held in this position by means of a master member latch element 94 pivoted on a stud 54 and pressed by a spring 255 in a clockwise direction so that the end 97 of this lever, which is a formed-down lug, may engage the flange 98 to retain the master member in its set position. When set for "high" speed the master member 43 travels substantially the same distance as for "normal" speeds but returns some distance before it is latched due to the position of the master member pivot 56 which has to be moved by arm 57. This difference in set position for "high" and "normal" speeds can readily be eliminated if a larger shutter casing is used. The latch member 94 at the opposite end is provided with an arm 99 which lies adjacent an oscillatable disk 100, this disk being freely movable about a stud 101 and including the spring 102 tending to drive this disk in a clockwise direction. When this disk has been set, which is the position shown in Fig. 17, a tooth 103 engages the end 104 of a tripping latch pivoted on stud 79 and normally turned by a spring 106 in a counter-clockwise direction. An arm 107 of this lever extends into the path of the upstanding lug 87 of the manually-operable lever 74 and, consequently, when the handle 75 is moved from the rest position shown in Fig. 17 to the tripped position of Fig. 4, the lug 87 engages the arm 107, releasing the tooth 103, permitting the oscillatable member 100 to turn in the direction shown by the arrow in Fig. 17, so that tooth 108 will strike arm 99 and release the latch 97—98 so that the master member may turn in a counter-clockwise direction about its pivot 56. When this occurs, the pin 65 carried by the master member, which is the striking surface of the master member, will move the arm 43 in the manner above described to produce the time of exposure indicated by the pointer 26 and the graduation 27 in Fig. 1.

When any but the highest speed exposure is to be made, the blade ring 34 swings in a clockwise direction under the impulse of the striking surface 65 against the contact surface 45 of the blade ring arm 43. This movement swings the flat surface 52 of pin 251 into contact with the blade ring holding latch 53 which latch is in the Fig. 13 position. Thus, movement of the blades is temporarily or momentarily arrested while the pin or striking surface 65 swings across the connecting surfaces 47 and 46 of the blade ring arm 43 and just before movement of the arm 43 is resumed by the striking surface 65 striking the contact surface 44, the flange 63 will strike the end 110 of the latch 53 as indicated in Fig. 13, moving this latch out of engagement with the pin 251 so that when the striking surface 65 engages the contact surface 44 the blades are free to move to their fully-closed position. The blades will be held in their fully-closed position because the striking surface 65 remains in contact with the master member arm 43. The blades therefore will be held against movement after an exposure.

In order to hold the blades against movement before exposure, the latch shown in Fig. 3 is used. This latch is spring-held in the operative position shown in Figs. 2 and 3 and, as indicated in Fig. 2, engages the point 51 on the blade ring 34 when the shutter is in its set position. Consequently, a jar will not tend to open the set shutter blades. Fig. 7 shows the spring 112 which positions a latch 48 and also indicates how this latch is released. When the arcuate plate 74 is moved by the handle 75 from its rest position "R" towards its tripped position "T", the lever moves in a counter-clockwise direction and a shoulder 113 on this latch will engage the upstanding lug 114 turning member 48 in a counter-clockwise direction, thereby releasing the latch element 50 from the latch element 51. The relative positions of the shoulder 113 and the lug 114 are such that the blade rings are released before the striking surface 65 can move the necessary distance to move the blade ring arm 43.

The present embodiment of my shutter does not include "time" exposure, that is, an exposure which is made by opening the shutter blades by depressing the trigger once and then by closing the shutter blades by depressing the trigger a second time. It does, however, include a means for producing a manually-controlled and prolonged exposure of the usual "bulb" type—that is, an exposure in which the trigger is depressed to open the shutter blades and in which the trigger is released to close them. To obtain this bulb exposure, use is made of the blade ring latch 53 best shown in Figs. 13 to 15 inclusive. This latch 53 is normally held by the spring 255 against a stop pin 116. The latch includes an upstanding lug 117 which is so positioned that it may be engaged by a hook 118 on the bulb lever 119 which is pivoted on the stud 58, also carrying the master member pivoted lever 57. A spring 120 tends to turn the bulb lever in the direction shown by the arrow in Fig. 14. This movement can only be accomplished when the upturned lug 121 can move a limited distance in the cam slot 122 shown in Fig. 22. The rest of this cam slot is a concentric groove 123 and when in this groove, the lug 121 will hold the bulb lever in its inoperative position shown in Fig. 14. However, as the speed cam control ring is turned until the pointer 26 lies opposite the graduation B, the lug 121 is brought into the widened cam area 122 so that the spring 120 will thrust the hook 118 behind the lug 117 of the blade ring latch. The blades will be held in their fully-opened position because the latch 53 can no longer be released by the flange 63 of the master member 43. Thus, the blades will be opened when the handle, serving as a trigger, 75 is depressed. When the handle 75 is released, the upstanding lug 87 moves away from arm 107 of the oscillatable member latch 104, so that the spring 106 can turn this latch member moving the arm 105 so that it will engage the upstanding lug 121 which also engages the cam slot 123. This will turn the bulb lever about its pivot 58 against its spring 120 causing the bulb lever 119 to be moved back from its Fig. 15 to its Fig. 14 position. As soon as the hook 118 releases the upstanding lug 117 the master member flange 63, through its engagement with the blade ring latch, releases this latch so that the master member can then close the shutter blades. The duration of a bulb exposure of course depends on the length of time that the handle 75 is depressed since the blades open when the handle 75 is moved from its "R" to its "T" position and closed when the handle moves from its "T" to is "R" position.

As above pointed out, the shutter blades 29 open and close in moving in one direction. Consequently, it is necessary to close the exposure aperture while the opening and closing movement of the blades takes place in setting the shutter. Certain features of the diaphragm leaf closing mechanism are similar to the Diaphragm shutter shown in my Patent 2,362,547 granted November 14, 1944, although the particular means for operating this mechanism is quite different.

Referring to Fig. 20, in the present embodiment of my invention I provide three diaphragm leaves 130, each of these leaves being pivotally mounted on pins 131 carried by the fixed diaphragm ring 132 also shown in Fig. 8. Each diaphragm leaf is provided with a cam slot 133 which engages a pin 134 carried by an adjustable diaphragm ring 135, this ring including recessed portions 136 permitting the ring to move about the pins 131. The movable diaphragm ring 135 includes an upstanding pin 135' which is engaged by the slot 137 in the end 138 of a lever 139, this lever being pivoted on a stud 140 carried by the mechanism plate 10.

The lever 139 includes an offset arm 141 having a pair of spaced upstanding ears 142 and 143, each of which is slotted to receive and hold an end 144 of a leaf spring 145, the opposite end of which engages an ear 146 on a pivoted lever 147, also mounted to turn on the stud 140. The lever 147 includes a flange 148 on the arm 149, this flange being positioned to be engaged by the striking surface 65 of the master member 43. This engagement only occurs when the master member is turning towards its set position and the relative position of flange 148 and the striking surface 65 is so arranged that the diaphragm leaves will be opened after the shutter blades have opened and closed during the setting movement.

The lever 147 carries a latch element 150 which may be engaged by a latch element 151 carried by the bell crank lever 152. This lever is pivoted on a stud 153 and, as shown in Fig. 14, a spring 154 tends to turn this lever in the direction shown by the arrow in Fig. 20 and into a position to latch the lever 147 in a position to hold the diaphragm leaves in an open position. The bell crank lever 152 is provided with an upstanding ear 155, this ear lying in the path of movement of the blade ring arm 43 and particularly the cam end 156 thereof, (Fig. 7). Referring to Fig. 6, when lever 43 swings to the left with respect to this figure, it will strike part 155 rocking the bell crank lever 152 in a clockwise direction so as to release the latch 150. When this is done, the diaphragm lever spring 157, (Fig. 20), through its engagement with a lug 158, will swing the lever 139 in a closing direction so that the diaphragm leaves will be completely closed shortly after the shutter blades have opened and closed to make an exposure.

The diaphragm leaf adjusting ring 135 is provided with a hook 160 which controls the total opening movement of the diaphragm leaves under the impulse of lever 147. Since there is a flexible connection or a lost motion connection between the lever 147 and the lever 139 because of the leaf spring 145, this spring will permit the diaphragm leaves to stop in any position determined by the pin 161, which pin is controlled by movement of a diaphragm operating plate 164 best shown in Fig. 8. A diaphragm finger piece 165 extends from part 164 up across the upstanding flange 2 of the shutter casing, terminating in a diaphragm pointer 166 which, as shown in Fig. 1, can be brought opposite a suitable graduation 167 of the diaphragm scale arranged around the bottom of the etched plate 23. This diaphragm blade stop is similar to that shown in my patent although the means for actuating the diaphragm lever 139 is quite different.

There are a number of advantages in providing an oscillatable member 100 which can swing upon its stud 101 under the impulse of its own spring 102 for operating the shutter. First, such an oscillatable member permits a shutter in which the trigger or release lever can be so arranged that an excessively light pressure on the trigger will release the shutter and this occurs without any tendency to shake the shutter. Second, it provides a part co-acting with the release of the shutter in such a manner that movement of the oscillatable member always bears a definite relationship to the various positions of the shutter blades. Consequently, it forms an ideal member on which a switch can be placed to make a circuit which can be used for synchronizing flash lamps. Third, it adds but little to the necessary force required for setting the shutter since the flange 89, through its engagement with a tooth 165, turns the oscillatable member as the handle 75 is moved to set the master member and the shutter blades.

If desired, my shutter may be equipped with a connecting plug 170 (Fig. 4) having one terminal 171 connected to an insulated wire 172 and having a second terminal 173 connected to a wire 174 grounded to the casing. The wire 172 may be passed around the flange 2 of the shutter casing in any convenient manner but preferably in a shallow groove 175, and it may be connected to a terminal 176 (Fig. 4) forming one element of a switch. The other element 177 of the switch is carried by a bell crank lever 178. This lever, as shown in Fig. 4, carries a pivot 179 on which a latch element 180 is mounted to turn, a spring 181 normally holding a lug 182 in the position shown in Fig. 4 against the bell crank lever. The opposite end 183 of the bell crank lever carries a gear segment 184, meshing with a pinion 185, carrying a flywheel or weight 186.

Each time the oscillatable member 100 turns in a clockwise direction, a tooth 187 may engage latch-arm 180 so as to turn the bell crank lever to control the speed of operation of the oscillatable member 100. The degree of engagement of this retarding member with the oscillatable member 100 may be controlled by the cam ring shown in Fig. 25. This ring 21 is provided with a step cam comprising three steps—190, 191, and 192. A pin 193 carried by the bell-crank lever 198 engages these cams and controls the time when the switch 177–176 makes contact relative to the full, open position of the blades. As indicated in Fig. 1, there is a pin 195 extending through a slot 196 in the etched plate 23. This pin may be moved opposite graduations 197 indicating the required millisecond delay for various different flash bulbs. For instance, the No. 5 flash bulb happens to require a five-millisecond delay and since the pin 195 is set at 5 in Fig. 1, the pin 193 in Fig. 25 being similarly positioned will give the required delay so that the flash lamp will reach its full brilliance while the shutter blades are fully opened.

The pin 193 is carried by the insulated section 198 which can be swung about the stud 199 on which the bell crank lever 178 is mounted.

Thus, movement of the cam 21 controls the position of the insulated segment 178 and with it the contact 176 relative to the contact 177. The latch 180 carries an upstanding lug 200, this lying in the path of pin 201 on the flash-adjusting cam 21 and contacting with it when the contact ring is adjusted to the zero position shown in Fig. 1. In this position the latch 180 will be rocked against the action of its spring 181 into an inoperative position so that the switch mechanism may not be moved at all when the synchronizing cam 21 is set to the zero position.

While it is possible to obtain the extremely high speeds with the single spring 60 driving the master member, if desired, an additional spring can be brought into play for the highest speed exposure here shown as 1/800 of a second. This is accomplished in the manner shown in Figs 18 and 19. On the master member pivot 56 I provide a lever 210 which is mounted to freely turn on the pivot 56. One end of spring 211 engages lever 210 and is coiled at 212 about the post 56. The arm 210 may be engaged by one of the steps of cam 213 so that when the pointer 26 is brought opposite the 800 on the scale 27, the lever 210 will be turned to the position shown in Fig. 18, while at the same time portion 68 of the cam will hold the cam follower 69 in its raised or high-speed position. Thus, spring 212 is added to spring 60 for the highest speed exposure only by turning the speed cam ring so that the cam follower 69 swings the pivoted lever in a generally radial direction to its high speed position. When the cam follower 69 is allowed to return to cam surface 71, spring 212 is unwound so that it is no longer operative to assist spring 60. In many cases it may be found that this additional spring is entirely unnecessary but it has been described as a useful addition to the master member described above.

The stepped cam surface 213 is positioned to engage an upstanding pin 220 carried by arm 67 pivoted on a stud 221. A spring 222 tends to turn this arm in the direction shown by the arrow in Fig. 4 so that the pin 220 resting against the stepped cam 213 limits the degree of engagement of this arm with the master member lug 66. Gear segment 223 meshes with a pinion 224 of a train of gears terminating in a starwheel 225 with which a pallet 226 may be engaged. The pallet 226 is pivoted at 227 upon a lever 228 pressed by a spring 229 into a starwheel-engaging position. However, the pin 227 extends upwardly into the cam slot 230 as indicated in Figure 22, so that the starwheel is only engaged for some of the more prolonged automatic exposures.

When setting the shutter it is necessary to move the handle 75 fully to the set position "S." The setting movement of the manually operable lever 74 causes nose 91 to engage and move the master member 64 and the lug 92 on lever 74 to move the blade rings through arm 43. Also striking surface 65 of the master member must strike flange 148 to open the diaphragm leaves 130 and latch them open by latch 150—151. Since the diaphragm leaves must be opened only after the shutter blades open and close and the timing is close, full setting is important.

A latch is therefore provided which will make it necessary to fully set the handle 75 through the last and critical part of its travel. Referring to Fig. 6 shows the extreme end 235 of the arcuate lever 74 as constituting one latch element, and the downwardly extending spring 236 the other latch element. Spring 236 has a downwardly turned flange 237 fastened on arm 238 of the oscillatable member latch lever 105 as by rivets 239. In Fig. 6 "D" shows the critical final setting movement. If not fully set and the setting lever returns before reaching this last movement, no harm is done.

When handle 75 is moved towards its set position "S," Fig. 16, the cam surface 240 swings lever 105 to the left in Fig. 16 so flange 237 lies below latch 235 and consequently any reverse movement after passing the spring latch 236 is prevented. Further movement of handle 75 swings the oscillatable member 100 so that cam 240 passes lever 105 and as soon as tooth 103 snaps past latch edge 104 the shutter, as well as the oscillatable member are all completely set and are now ready for exposure. This is a safety feature, not essential but useful.

In order to visualize the size of my present shutter constructed in accordance with a preferred embodiment of my invention, as shown in the drawings, it might be pointed out that the view in Fig. 4 is approximately four times the actual size of this shutter which will be known as a No. 1 shutter. It is probable that there will be at least one smaller size and several larger sizes, but the first shutter is being considered in the No. 1 size which has a clear exposure aperture of .765 inch. Throughout the drawings applicant has endeavored to closely follow the various parts to actual scale although in some instances, and particularly where springs are shown, it is impossible to show them of the correct thickness and still retain the type of showing required in Patent Office drawings. In many of the views, parts have been omitted in an effort to clearly show the construction of other parts. I have been able to obtain, with the above-described shutter mechanism, an exposure of $\frac{1}{800}$ of a second with a clear exposure aperture of .765 inch using the standard system of measuring effective exposures. It is undoubtedly possible to obtain considerably faster exposures at some sacrifice of durability because I have provided extremely high speeds utilizing only springs of the type which are now in use in standard shutters on the market without increasing the tension on these springs. This is accomplished by reducing the moving parts necessary for driving the shutter blades from the master member to a minimum. In addition, I have provided a shutter in which the release requires only a very light or delicate pressure on the trigger, thereby noticeably reducing vibration of the shutter which frequently occurs from relatively heavy trigger pressure. The master member is small and of comparatively light weight and it acts directly upon an arm carried by one of the blade rings so that additional intermediate parts heretofore rather generally used have been omitted.

The master member has a striking surface which moves through an arcuate path, this path being changed for "normal speed" and "high speed" exposures. The length of the striking surface of the master member is only approximately one-third the length of the blade ring arm measuring each from its own center of rotation. The master member striking surface 65 travels about twice as many degrees about its pivot before striking the contact surface 44 for "high speed" than it does for striking surface 45 for "normal speed" in the embodiment of my invention illustrated in the drawings. This data is by way of illustration since it is obvious that by altering the size of the parts these various ratios can be readily changed.

However, I have found the above data desirable in an extremely compact shutter of the type shown in the present embodiment of my invention.

The operation of my improved shutter is extremely simple, although a description of the various movements of the parts which take place inside the shutter casing is necessarily rather long. Assuming the shutter is in its normal condition of rest after an exposure has been made, as shown for instance in Fig. 4, the handle 75, which serves both as a trigger and a setting lever, is in its position of rest "R." The operator selects the required speed by turning the narrow ring speed-adjusting cam 16 until the pointer 26 is brought opposite a graduation 27 on the shutter cover plate 23. If the diaphragm opening has not been selected, the lever 166 may be moved to the required diaphragm opening graduation 167 also on the cover plate 23. If a flash exposure is not required, the knob 195 may be moved to the graduation zero on the scale 197 on the shutter cover plate.

The operator then moves handle 75 from its rest position "R" to its set position "S." This movement accomplishes a series of different things. First, referring to Fig. 6, the nose 91 of the lever 74 strikes part 64 of the master member, turning it to its set position and winding up the driving spring 60. Second, the lug 92 on the lever 74 moves the blade ring arm 43 about its center of rotation causing the shutter blades to open and close. Third, the striking member 65 on the master member engages the lever 149 swinging it to tension spring 145, this spring in turn, as shown in Fig. 20, overcoming spring 157 of the diaphragm leaf lever 139 and causing the diaphragm leaves to open to the pre-selected stop as controlled by the pin 161 and the hook 160 on the diaphragm leaf-adjusting ring 135. Fourth, the movement of the lever 74, as indicated in Fig. 6, causes flange 89 to engage the oscillatable member or starwheel tooth 165 turning this member while tensioning its spring 102. As all these movements are accomplished, various latches drop into position to hold the parts in their set position.

The master member is held in its set position by means of the latching flange 97 engaging the master member flange 98. The shutter blade arm 43 is held in its position by means of the latch 50 engaging the blade ring latch 51. The oscillatable member 100 is held in its latched position by means of the end 104 of the latch 105, dropping behind the tooth 103 on the oscillatable member. All of the parts are positioned automatically, and there is an additional safety spring latch 236 adapted to momentarily hold the latch element 235 of the lever 74 against backward movement until all of the parts have been moved and latched in their set position. The shutter is now ready for an exposure and it should be noticed that as soon as the full setting stroke has been accomplished, the release of the handle 75 causes the spring 86 to return the setting lever from its "S" position to its rest or "R" position shown in Fig. 1 from which position the handle 75 may serve as a trigger to release the shutter. With the parts set as indicated in Fig. 14, (which shows the shutter set but which does not show the shutter handle 75 released and returned to its "R" position) the trigger may be depressed moving the handle 75 from its "R" position to its tripped position "T." This movement causes the lug 87 of lever 74 to strike arm 107 of lever 105 turning this oscillatable member latch in a clockwise direction and releasing the tooth 103 from the latch 104. The oscillatable member 100 turning under the power of its own spring will cause tooth 108 to strike the end 99 of the master member latch releasing the latch element 97 from the shoulder 98 and permitting the master member to turn. As the master member turns, since the shutter has been set for a "normal speed" exposure, the striking surface 65 will first engage the contact surface 45 swinging the blade ring 31 in a counter-clockwise direction while blade ring 34 moves in an opposite direction. The striking member will ride over faces 47 and 46 during which time the blade rings will momentarily remain stationary because of the engagement of latch 53 and pin 251. However, when the striking surface 65 engages contact surface 44 flange 63 of the master member releases the latch 53 and as the pin 65 engages the surface 44 the latch, having been just released, permits the shutter arm 43 to be again driven to close the blades. The shutter blades will be held in a closed position because of the pressure of the striking member 65 on the arm 43.

If the shutter should have been set for its "high" speed exposure, the master member would be given an additional impetus because the spring 212 carried by the lever 210 is tensioned when the speed-adjusting cam is moved. Thus, not only is the master member driven under higher spring power for the top speed exposure but, in addition, the striking surface 65 thereof travels a greater distance since it directly engages the surface 44 of the blade ring arm 43 and swings it in one continuous, smooth, uninterrupted movement to open and close the blades. During this movement the blade ring latch 53 is held out of its operative position.

If the shutter had been set for bulb exposures, the latch 53 would be held in by the bulb lever 119 through the engagement with the upstanding lug 117 on the blade ring latch, so that it would require an upward movement of the handle 75 from its "T" position to its "R" position in order for the shutter blades to close.

If a synchronized flash is to be used, the knob 195 is set to the required graduation on scale 197 and the shutter is actuated exactly as before, except that since the oscillatable member 100 has a speed definitely related to the opening and closing of the shutter leaves, the required millisecond delay can be accurately obtained. If the flash is not to be used, the knob 195 is turned to the zero graduation so that the flash retard mechanism is then inoperative.

While I have described a preferred form of my invention, it is obvious that many variations can be made from the specific structure shown in the drawings and described in the above specification without departing from my invention as defined in the following claims.

What I claim is:

1. In a camera of the type including an apertured casing, two interconnected blade rings movably mounted in the casing, shutter blades operatively connected to the blade rings for movement to make an exposure through the shutter casing aperture, the combination with said blade rings, of a master member, means for setting and releasing the master member, a striking surface on the master member movable through an arcuate path, an arm on one blade ring positioned to be struck by the striking member for operating the shutter blades, a diaphragm mechanism including leaves spring pressed toward an aperture closing position, a first diaphragm operating lever, a second diaphragm lever, a resilient connection between the first and second levers, the second lever lying in the path of the striking surface for closing the diaphragm leaves, said means for setting and releasing the master member causing movement of the striking surface in one direction for setting the shutter, said movement opening the diaphragm leaves through the first diaphragm operating lever, the second diaphragm lever and the resilient connection between the first and second levers, said striking surface moving in a reverse direction when the master member is released for operating the shutter blades whereby the diaphragm mechanism spring may move the leaves to a closed position.

2. A shutter as defined in claim 1 characterized by a means for delaying the closing of the diaphragm leaves until said shutter blades have closed after an exposure is completed.

3. A shutter as defined in claim 1 characterized by a shutter blade ring latch positioned to stop movement of said shutter blade ring with the blades fully opened, said blade ring latch being positioned for release through movement of the master member and means for releasing the diaphragm mechanism including leaves for movement under the impulse of the spring tending to move the diaphragm leaves to a closed position only after said latch has been released by the master member.

4. A shutter as defined in claim 1 characterized by a pivoted lever carrying the master member into either of two positions, the striking surface of the master member and the lever operating the diaphragm leaves being positioned to co-act in both positions of the master member.

5. In a camera of the type including an apertured casing, two interconnected blade rings movably mounted in the casing, shutter blades operatively connected to the blade rings for movement to make an exposure through the shutter casing aperture, the combination with said blade rings, of a master member, means for setting and releasing the master member, a striking surface on the master member movable through an arcuate path, an arm on one blade ring positioned to be struck and moved by the striking member for opening and closing the shutter blades, a diaphragm mechanism including leaves spring pressed toward an aperture closing position, a diaphragm operating lever lying in the path of and movable by the striking member for opening the diaphragm leaves against the diaphragm mechanism closing spring, and a lost motion connection between the diaphragm lever and the diaphragm mechanism coacting with means for limiting the opening movement of the diaphragm lever to a predetermined extent.

6. In a camera of the type including an apertured casing, two interconnected blade rings movably mounted in the casing, shutter blades operatively connected to the blade rings for movement to make an exposure through the shutter casing aperture, the combination with said blade rings, of a master member, means for setting and releasing the master member, a striking surface on the master member movable through an arcuate path, an arm on one blade ring positioned to be struck and moved by the striking member for opening and closing the shutter blades, a diaphragm mechanism including leaves spring pressed toward an aperture closing position, a first diaphragm operating lever, for moving the diaphragm leaves, a second diaphragm lever lying in the path of and movable by the striking member for opening the diaphragm leaves against the diaphragm mechanism closing spring, a lost motion connection between the first and second diaphragm levers including a leaf spring anchored on the first diaphragm lever at one end and contacting the second diaphragm lever at the opposite end, whereby the diaphragm leaves may be resiliently pressed toward an open position by said leaf spring.

7. In a camera of the type including an apertured casing, two interconnected blade rings movably mounted in the casing, shutter blades operatively connected to the blade rings for movement to make an exposure through the shutter casing aperture, the combination with said blade rings, of a master member, means for setting and releasing the master member, a striking surface on the master member movable through an arcuate path, an arm on one blade ring positioned to be struck and moved by the striking member for opening and closing the shutter blades, a diaphragm mechanism including leaves spring pressed toward an aperture closing position, a first diaphragm lever operably connected to the leaves, a second diaphragm operating lever lying in the path of and movable by the striking member for opening the diaphragm leaves through the first diaphragm lever, and a lost motion connection between the first and second diaphragm levers including a leaf spring, a lug on the second diaphragm lever against which one end of the leaf spring may rest, the first diaphragm lever including a pair of slotted spaced lugs carried by the first diaphragm lever, the other end of said leaf spring engaging and being held by the slots of the pair of spaced lugs.

8. In a camera shutter of the type including an apertured casing, two interconnected blade rings movably mounted in the casing, shutter leaves operatively connected to the blade rings for movement to make an exposure through the shutter casing aperture, the combination with said blade rings, of a master member, means for producing the exposures of different durations including a pivoted lever movably carrying the master member, a striking surface on the master member having an arcuate path of movement, means for setting and releasing the master member, an arm carried by a blade ring having different contact surfaces thereon and positioned to co-act with the master member striking surface, means for moving the pivoted lever to select the contact surface of the arm to be struck by the striking surface of the master member, to operate the blade rings to make an exposure, diaphragm leaves, a pivotal mount for the leaves movable to close the shutter casing aperture, a pivoted lever for operating said leaves, a spring tending to close said leaves, a setting member for tensioning the master member, an arm carried by the setting member for engaging and moving a pivoted lever for moving the diaphragm leaves to an open position, a leaf spring connecting the pivoted lever operating the shutter blades and the pivotal mount for the leaves for transmitting movement therethrough, the means for setting and releasing the master member including means for tensioning the master member by turning said master member about its pivot, and means included in the setting member for engaging the generally radially-extending arm of the blade ring to move the blades as the master member is being set.

9. In a camera shutter of the type including an apertured casing, two interconnected blade rings movably mounted in the casing, shutter leaves operatively connected to the blade rings for movement to make an exposure through the shutter casing aperture, the combination with said blade rings, of a master member, means for producing the exposures of different durations including a pivoted lever movably carrying the master member, a striking surface on the master member having an arcuate path of movement, means for setting and releasing the master member, an arm carried by a blade ring having different contact surfaces thereon and positioned to co-act with the master member striking surface, means for moving the pivoted lever to select the contact surface of the arm to be struck by the striking surface of the master member, to operate the blade rings to make an exposure, diaphragm leaves, a pivotal mount for the leaves movable to close the shutter casing aperture, a pivoted lever for operating said leaves, a spring tending to close said leaves, a setting member for tensioning the master member, and a lever having an arcuate path of movement about approximately the center of rotation of the blade ring and including a lug to engage and move the blade ring arm while setting the master member.

CARL C. FUERST.

REFERENCES CITED

The following references are of record in the file of this patent:

UNITED STATES PATENTS

| Number | Name | Date |
| --- | --- | --- |
| 2,384,615 | Fuerst | Sept. 11, 1945 |